United States Patent [19]
Forestieri et al.

[11] Patent Number: 5,228,009
[45] Date of Patent: Jul. 13, 1993

[54] PARAMETRIC CLUTTER ELIMINATION

[75] Inventors: Steven F. Forestieri, Santa Clara; Ray S. Spratt, San Jose, both of Calif.

[73] Assignee: Diasonics, Inc., Milpitas, Calif.

[21] Appl. No.: 867,038

[22] Filed: Apr. 10, 1992

[51] Int. Cl.$^5$ .............................................. G03B 42/06
[52] U.S. Cl. ...................................... 367/135; 367/7; 367/11; 367/901; 364/413.25; 128/261.09
[58] Field of Search ................... 367/7, 11, 901, 135; 364/574, 572, 413.25, 413.18, 413.13; 342/162, 159; 358/112; 128/661.09, 661.07, 660.07, 660.01

[56] References Cited
U.S. PATENT DOCUMENTS 3,869,601 3/1975 Metcalf ............................... 364/572
5,058,593 10/1991 Forestieri et al. ............... 128/661.07

Primary Examiner—Daniel T. Pihulic
Attorney, Agent, or Firm—Blakely, Sokoloff, Taylor & Zafman

[57] ABSTRACT

Signal processing apparatus and methods for elimination of undesirable clutter signals from desirable signals. This is performed without the use of filters by subtracting orthonormal basis functions from signal samples until the appropriate degree of clutter removal is achieved. Estimates of frequency information such as Doppler shifts due to fluid flow may thus be achieved with superior discrimination of true flow signals from sources of clutter or artifact, greater sensitivity to low flow rates, minimal computational effort and with fewer samples than the prior art.

29 Claims, 10 Drawing Sheets

PARAMETRIC CLUTTER ELIMINATION

BACKGROUND OF THE INVENTION

1. Field of the Invention

The present invention relates to signal processing. More specifically, the present invention relates to a signal processing method and apparatus which uses time-domain digital signal processing for removal of clutter from a signal.

2. Background of Related Art

Pulse-echo ultrasonic imaging technology has become a vital tool for clinicians for examining the internal structure of living organisms. In the diagnosis of various medical conditions, it is often useful to examine soft tissues within the body to show structural details of organs and blood flow in these organs. Experienced clinicians can use this information in diagnosing various pathologies.

To examine internal body structures, ultrasonic images are formed by producing very short pulses of ultrasound using a transducer, sending the pulses through the body, and measuring the properties of the echoes (e.g., amplitude and phase) from targets at varying depths within the body. Typically, the ultrasound beam is focused at various depths within the body in order to improve resolution or image quality. The echoes are received by a transducer, typically the same transducer used for transmission, and processed to generate an image of the object, usually referred to as a B-scan image.

Measuring and imaging blood flow (or other fluid flow) in the human body is typically done using the Doppler principle, wherein a transmitted burst of ultrasound at a specific frequency is reflected from moving blood cells, thereby changing the frequency of the reflected ultrasound in accordance with the velocity and direction of the flow.

The frequency shift of these reflected signals with respect to the transmitted signals may be detected and since the amount of the shift (or the Doppler shift) is proportional to the blood flow velocity, it may be used to display velocity information of blood flow on a video screen for imaging the living patient.

Undesirable signals, which are commonly called clutter (or sometimes flash artifacts) often arise from structures and targets in the body which may have Doppler shifts, or from movement of the transducer by the operator, but do not represent blood or fluid flow. Examples of these clutter signals include tissue motion due to the heart beat, arterial pulse or respiration. Such unwanted signals are typically filtered out or otherwise processed, so that the image produced only represents blood flow and clutter is suppressed.

In color Doppler imaging this processed frequency information is used to form a two-dimensional image or profile of the blood or fluid flow velocity.

A typical ultrasound system for color Doppler imaging is shown in FIG. 1 as imaging system 100. Imaging system 100 generally comprises a probe 101, which is typically a multi-element array of one hundred or more piezoelectric elements which both send and receive ultrasound signals when examining the human body. Probe 101 is coupled via signal path 110 to transmitter/receiver circuitry 102, which is designed according to principles well known in the ultrasound imaging art and for purposes of brevity will not be discussed in detail here.

Transmitter/receiver circuitry 102 is coupled to a control unit 109 via bus 120 and is controlled so that the elements in probe 101 are focusing at particular points in the body, both on transmit and receive. Transmitter/receiver circuitry 102 and control unit 109 also often provide a scanning function such that a two dimensional image may be generated without moving probe 101 with respect to the body.

Following transmission of ultrasound signals into the body, reflected signals are processed by the receiver function (which is typically known as a beamformer) in transmitter/receiver circuitry 102 and the multitude of signals from each individual element of probe 101 are converted into a single signal which is sent to RF (Radio Frequency) processor 103 via signal path 111.

RF processor 103, also under the control of control unit 109 via bus 120, processes the signal information to produce a detected and unipolar envelope signal and in-phase (I) and quadrature (Q) Doppler signals. The envelope signal represents the amplitude of echoes returning from the body and is further transmitted via signal path 114 to a scan converter 105 which is a typically a large electronic memory, also well known in the art.

Scan converter 105, also under the control of control unit 109 via bus 120, stores the envelope echo information on a line by line basis together with the geometrical position of such information in the body resulting from the scanning process, in such a manner that a two-dimensional video image may be constructed and transmitted to video processor 127 via signal path 116. Video processor 127 is also under the control of control unit 109 via bus 120.

In the absence of any color Doppler information, video processor simply sends a conventional video signal over signal path 119 to video display monitor 130. This two-dimensional image, usually black and white, represents the distribution of echo generating sites within the body. The so-called B-scan image is thus used by the operator to search the body for pathology or by the physician in developing a diagnosis.

I and Q signals for so-called single-gate Doppler are sent to Doppler processor 106 via signal path 113. Doppler processor 106, under the control of control unit 109 via bus 120, using signal processing methods well known in the art, compares signals from several successive echoes to determine the Doppler shift in a single region in the body which is commonly known as the sample volume. Doppler processor 106 also typically produces a continuous time series of spectral Doppler information in which blood flow velocities are displayed in black and white on video display 130 over one or more cardiac cycles (typically several seconds), having first been sent to scan converter 105 via signal path 115, to video processor 127 via signal path 116 and to video display 130 over signal path 119.

Finally, the third path to video display 130 is the color Doppler path in which the preferred embodiment may effect the signal, as discussed below.

RF processor 103 transmits I and Q signals via signal path 112 to color flow processor 104 which is also controlled by control unit 109 via bus 120. Color flow processor 104 typically processes several Doppler sample volumes along a given scanning direction in the body. Details of prior art color flow processing will be discussed below.

Color flow processor passes signals to color scan converter 108, also under the control of control unit 109 via bus 120, via signal path 117 where, in a manner similar to the black and white scan converter 105, color encoded signals are stored on a line by line basis, together with the geometrical position of such information in the body resulting from the scanning process, in such a manner that a two-dimensional color video image may be constructed and transmitted to video processor 127 via signal path 118.

Color scan converter 108, which may also be used to interpolate scan line information obtained from color flow processor 104, then transmits color Doppler information via signal path 118 to video processor 127 for display on video display 130. Video processor 127 typically includes so-called decision circuits to choose whether a given specific part of the two dimensional image has color information resulting from flow or whether it only has echo information from static tissue. If flow is present, the color information is displayed at the correct point in the image rather than the black and white image information.

This final composite two-dimensional color image showing blood flow in color overlaid on a black and white image represents the velocity of blood flow in vessels or organs and is used by the clinician to form a diagnosis of flow related pathology.

Control unit 109 is further coupled to a keyboard 125 for operator inputs and a mouse, trackball or other device 126 for movement and control of information shown on video display 130.

DETAILED DISCUSSION OF PRIOR ART COLOR FLOW PROCESSORS

FIG. 2 is a more detailed schematic description of a typical prior art color flow processor such as that shown in FIG. 1 as block 104.

In prior art color flow processors, I and Q data passed over signal path 112 to color flow processor 104 are typically passed through analog filters 160, commonly known as a wall filters. Wall filters 160 are used in an attempt to remove clutter signals from desirable flow signals. For simplicity in the following discussion, only one of the channels of data, the I or in-phase channel will be described. Similar filtering is also applied to the Q or quadrature channel.

FIG. 3 depicts these two types of signals in the frequency domain representation well known to those skilled in the art. The frequency dimension is related to flow through the well known Doppler equation:

$$f_d = \frac{2f_c v \cos \theta}{c}$$

where $f_d$ is the Doppler frequency shift (Hertz) resulting from a target moving at velocity v (meters/sec), when interrogated by sound of frequency $f_c$ (Hertz) at an angle $\theta$ in a medium of velocity of sound c (meters/sec).

Clutter signals are represented in FIG. 3 by spectrum 150 which begins at a high amplitude at zero frequency, (i.e. zero frequency equates to no motion) and diminishes to zero amplitude at frequency $f_1$ which corresponds to a certain velocity according to the equation above. Such signals might arise from tissue which is moving due to the arterial pulse, respiration or relative motion between the patient and the probe. This clutter is often called a flash artifact.

A second spectrum 152 is shown in FIG. 3 and corresponds to desirable signals from flow such as blood flow. Spectrum 152 extends from frequency $f_2$ to $f_3$ and is typically very much smaller amplitude than the clutter 150. Note that in FIG. 3, the two spectra overlap, which is often the case. This overlap usually results in clutter signals being confused with flow signals in the signal processing, which is typically seen in the image as color displayed outside of regions where there is blood flow, i.e. where it anatomically implausible.

Prior art systems have used analog electronic implementation of wall filter 160 (generally known more precisely as a high pass filter by those skilled in the art) in an attempt to isolate the desirable flow signals from clutter. FIG. 4, again a frequency domain representation, shows such a high pass filter. The high pass filter function 160 eliminates the majority of clutter signal 150, and passes most of the desired flow signal spectrum 152. However, it can be seen that a fraction 156 of the clutter signal (that portion of 150 below line 154) is also passed through. Furthermore, in this analog electronic implementation, high pass filter 160 also has a ripple 155 which tends to accentuate certain frequencies in the desirable signal spectrum 152, thus possibly introducing an artifact in quantitative measurements. Various types of high pass analog filters, well known to those skilled in the art may be implemented such as Bessel, Chebyshev, elliptical, etc, however, each has certain tradeoffs and undesirable features.

Another shortcoming of prior art imaging systems using analog filtering to eliminate clutter is that wall filters 160 eliminate a portion of the desirable Doppler signal, thus reducing the fidelity of the imaging system.

Following the analog wall filter, the signals are passed to an analog to digital converters (A/D) by signal path 165 so that additional processing may be performed upon the data. The digitized information is then passed to a velocity estimator 180 by signal path 175.

Velocity estimators such as autocorrelation, maximum entropy, the Discrete Fourier Transform and one dimensional time correlation have been used to derive the desired information from the filtered signals. Again these methods are well known to those skilled in the art and the literature is replete with various algorithms and approaches.

Because of the large signals from stationary or slow moving objects left in the high passed signal and the relatively small desirable signals, many of these prior art velocity estimation techniques require many samples of to be averaged to assure an adequate signal-to-noise ratio. For instance, in one prior art system, 16 samples from successive pulses are used to interrogate the sample volume. Such averaging clearly leads to very long processing times and low frame rates.

Some prior art systems have used digital filtering to replace analog filters 160. In such systems, analog to digital converters 170 would be moved ahead of wall filters 160.

Other approaches to digital filtering include so called Infinite Impulse Response (IIR) and Finite Impulse Response (FIR) filters. IIR filters have excellent frequency response, however, the transient response of these filters is often an order of magnitude longer than the time to produce the selected number of samples. FIR filters have no transient response problems, however they must be initialized by data from several samples in order to achieve good frequency response.

Thus, prior art techniques which employ filtering methods to remove unwanted clutter signals from desirable flow signals, whether analog or digital, have significant limitations.

SUMMARY AND OBJECTS OF THE INVENTION

One of the objects of the present invention is to provide a method and means for removing the clutter from the signal without the use of filters.

Another of the objects of the present invention is to provide a method and means for eliminating the clutter in a signal while minimally effecting the useful portion of the signal.

Another of the objects of the present invention is to improve the sensitivity of ultrasonic imaging apparatus to low velocity flows.

Another of the objects of the present invention is to reduce the number of samples required to determine the Doppler shift information in an ultrasonic imaging apparatus while maintaining a high signal-to-noise ratio.

Another of the objects of the present invention is to provide an improved method and means for eliminating the clutter from a signal without extensive signal processing and/or arithmetic computations.

These and other objects of the present invention are provided for by methods and apparatus for clutter elimination from a signal which comprises means for digitizing a signal to generate n samples. In one embodiment, the signal results from ultrasonic echoes from the human body caused by sending an acoustic pulse into the living patient, such as in an ultrasonic imaging apparatus. The apparatus comprises a means for fitting a first basis function to the samples of the signal and a means for subtracting the first basis function from the samples. A means for storing the difference as a first difference signal and performing a frequency estimate using the first difference signal is provided. In another embodiment, the apparatus further comprises means for fitting successive orders of basis functions to the first difference signal. The apparatus also has means for subtracting successive orders of the basis functions from the first difference signal and storing the difference as a second difference signal. In one embodiment, the basis functions comprise the Legendre series of polynomials.

These and other objects of the present invention are provided for by methods and apparatus for clutter elimination from signals which comprises signal reception means for receiving signals and means for digitizing said signals to generate n samples. The apparatus further comprises means for accumulating the coefficient of fits to j basis functions for the lowest of the first n−1 samples in a first accumulated value and means for accumulating the coefficients of fits to j basis functions for the highest of the last n−1 samples in a second accumulated value. The apparatus has means for accumulating the first lag of the autocorrelation in a first autocorrelation value and means for accumulating the zero lag autocorrelation in a second autocorrelation value. The apparatus further comprises means for determining a frequency estimate from the first autocorrelation value and the first and second accumulated values. The apparatus may also comprise means for determining a final zero lag autocorrelation value from the first accumulated value and the second autocorrelation value, which, in a preferred embodiment, is used for thresholding the frequency estimate of the data.

BRIEF DESCRIPTION OF THE DRAWINGS

The present invention is illustrated by way of example and not limitation of the figures of the accompanying in which like references indicate like elements and in which.

DETAILED DESCRIPTION

The present invention is an apparatus and method for processing data, including ultrasonic data in an ultrasonic imaging system. In the following description, numerous specific details are set forth such as specific hardware components, signals, etc., in order to provide a thorough understanding of the present invention. It will be obvious, however, to one skilled in art that these specific details may not be required to practice the invention. In other instance, well-known components have not been described in detail in order to not unnecessarily obscure the present invention.

In addition, it can be appreciated by one skilled in the art that several of the techniques applied to ultrasonic imaging signal data discussed here may be equally applied to other fields of signal processing.

Figure 1:
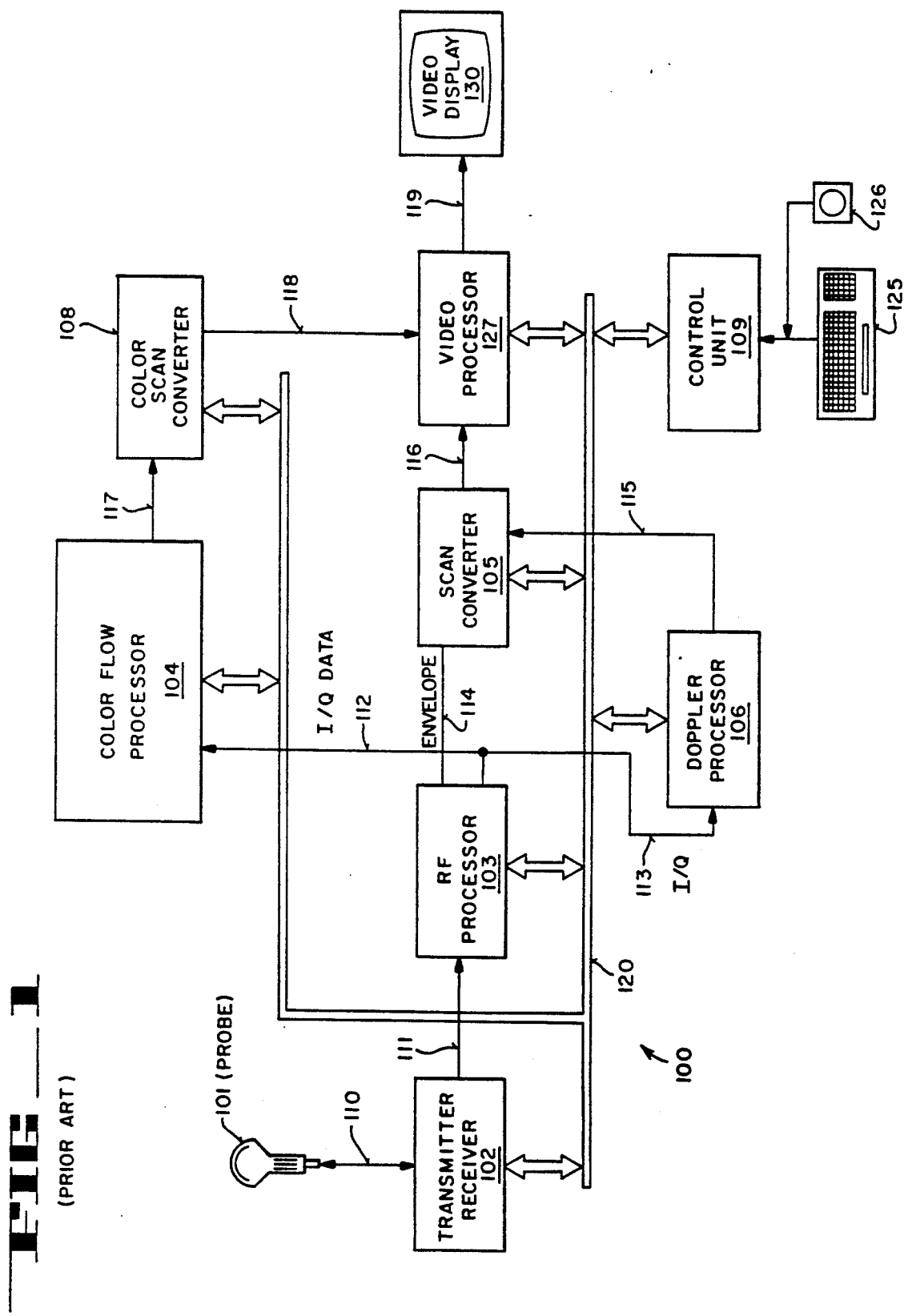
FIG. 1 shows a prior art ultrasonic imaging system.
Figure 2:
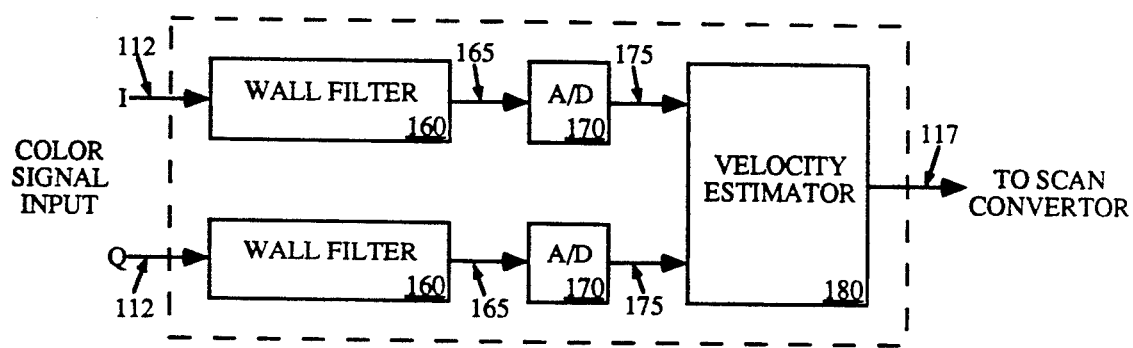
FIG. 2 shows a prior art color flow processor.
Figure 3:
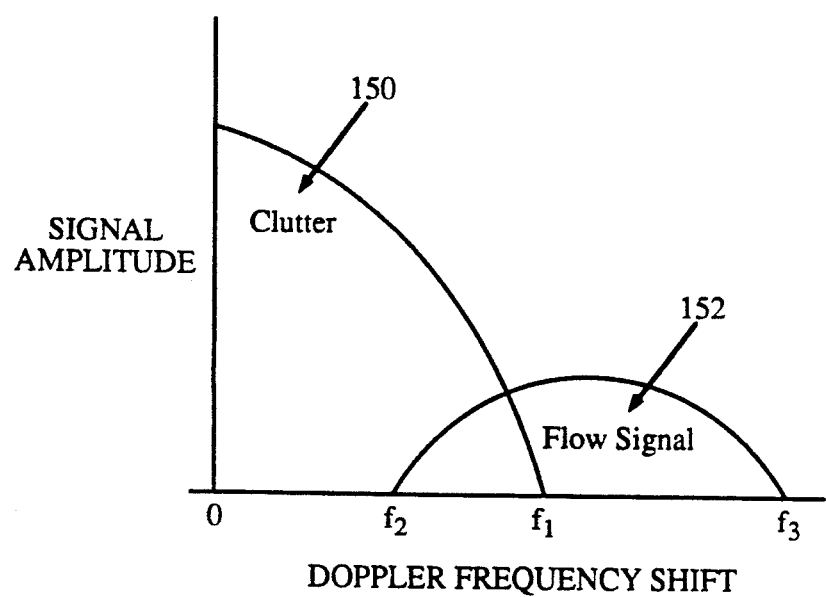
FIG. 3 shows a typical frequency spectrum of flow signals and clutter signals.
Figure 4:
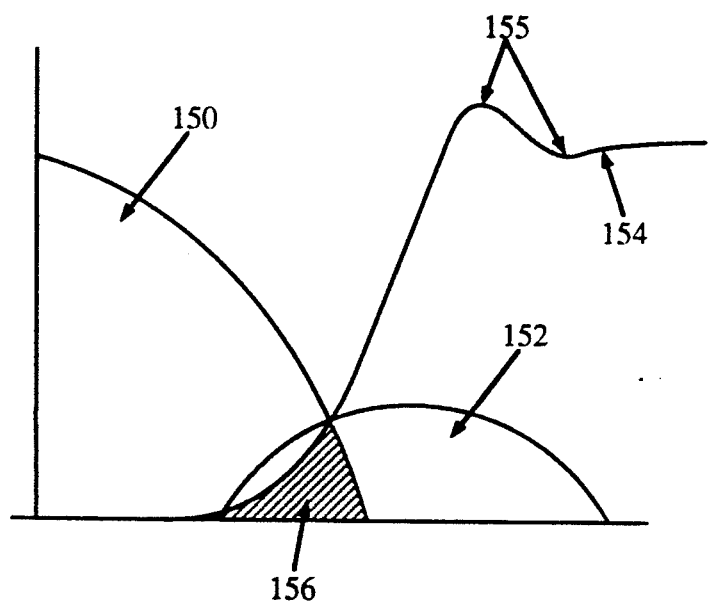
FIG. 4 shows a typical prior art filtering method for attempting to separate desirable flow signals from undesirable clutter signals.

The preferred embodiment resides in a system which has a color flow processor such as 104 shown in the apparatus in FIG. 1. This may include, for example, an apparatus such as that discussed in U.S. Pat. No. 5,058,593, dated Oct. 22, 1991 which is also assigned to Diasonics, Inc., the assignee of the present invention. The method and apparatus of the preferred embodiment may be implemented in discrete hardware components or, alternatively, in computers or digital signal processors using software which is loaded from disk-based storage and executed at run time. Programs containing the methods employing the preferred embodiment may also reside in firmware or similar non-volatile storage means.

The preferred embodiment provides a means for maintaining the fidelity of a signal in a digital signal processing environment while removing clutter. The technique processes a signal by removing a selected set of basis functions from the signal in order to remove that portion of the signal representing clutter.

Figure 8:
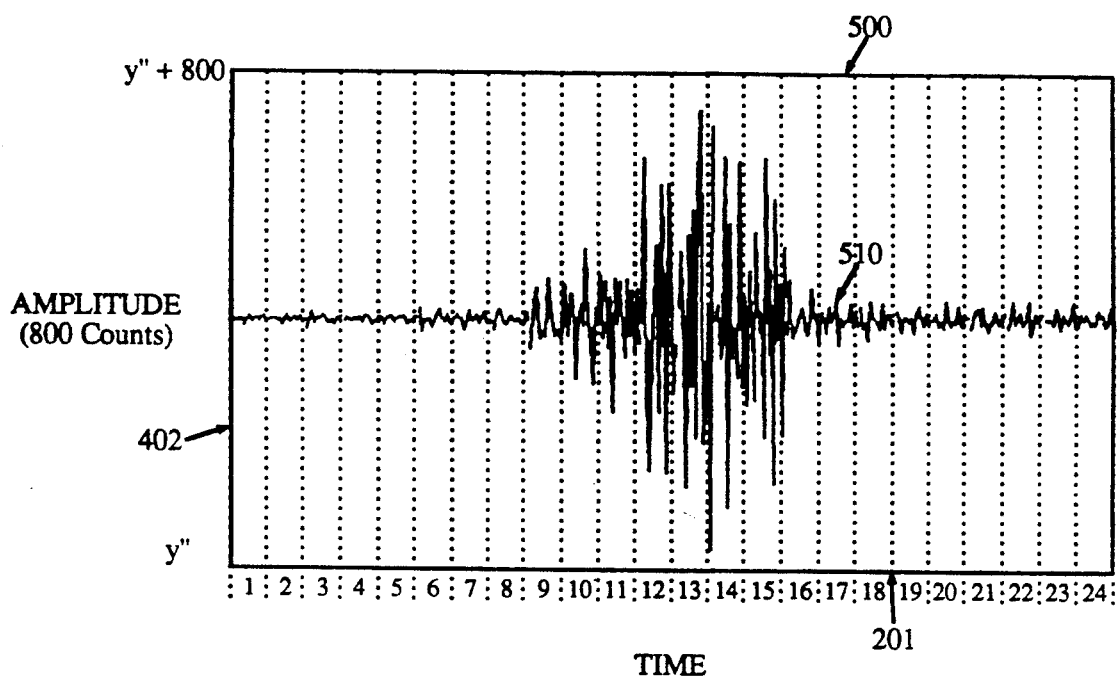
FIG. 8 shows the signal data from FIG. 7 after a quadratic term has been removed.

For instance, in this embodiment of the processing method as shown in FIGS. 5 through 8, a single basis function consisting of a constant term is removed first, by subtracting the average of the data samples in each volume. Secondly, linear terms are estimated from and removed from the data in each sample volume, respectively. Quadratic terms are finally estimated and removed from each sample volume, respectively with the result as shown in FIG. 8 that only the data resulting from motion remains.

In another embodiment, the user may adjust the highest order of basis function to be subtracted from the data. So, if the user requires, he can subtract four or five orders of basis functions. The highest order of basis function is dependent entirely upon the user's needs or the signal being processed.

Figure 5:
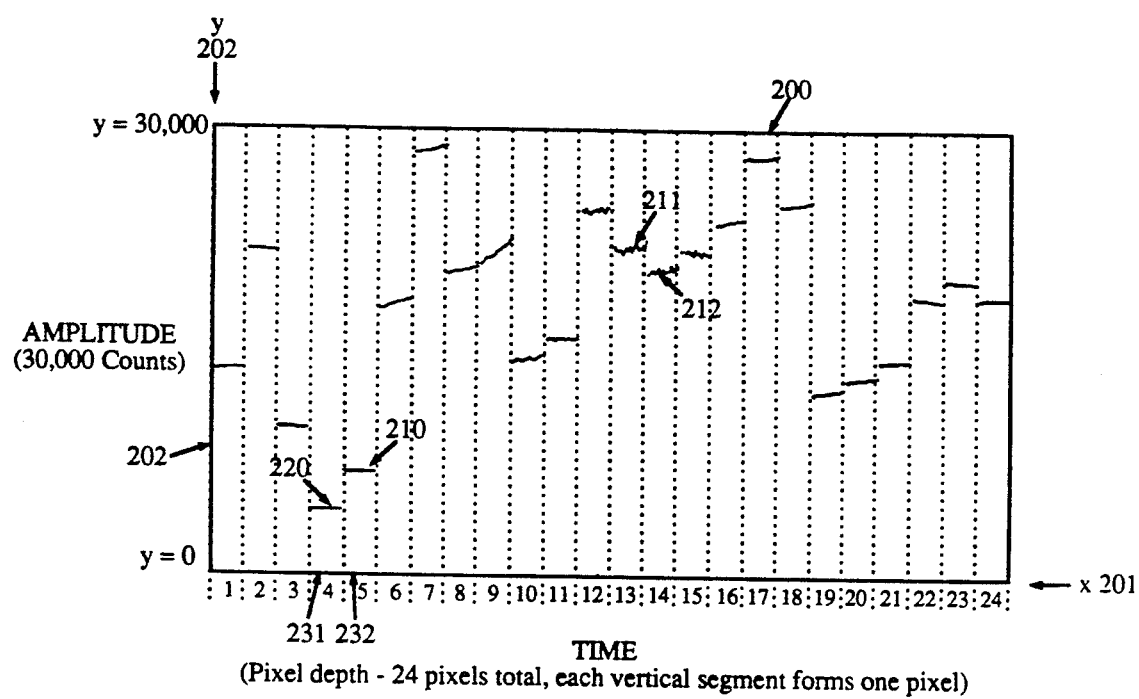
FIG. 5 shows an example of a portion of a digitized color flow signal before processing, obtained from a living patient for 24 color sample volumes.

FIG. 5 shows an example of raw Doppler data for several color sample volumes in a living patient. Only the in-phase (I) data is shown for simplicity. The process is similarly applied to the quadrature (Q) data. The I signal can be examined in each sample volume and the clutter can be successively removed.

Actual data representing signals from the A to D converters in color flow processor 104 are shown in FIG. 5. Each vertical band such as 231 and 232 (separated by vertical dotted lines in FIG. 5) is known as a color sample volume and corresponds to a different 0.5 mm depth in the patient, with depth increasing from left to right in this plot. The x-axis 201 in plot 200 represents time, or various depths in the body of the color sample volumes, and the y-axis 202 represents the amplitude of the received reflected signals. Note that the y-axis runs from y=0 to y=30,000 in FIG. 5. The 24 color sample volumes in plot 200 comprise one scan line in one color frame.

The data of FIG. 5 is from 16 consecutive pulses covering the 24 sample volumes which are contiguous in depth. The data have been sorted by sample volume, so that each segment between the vertical dotted lines in FIG. 5 contains the 16 data points from that specific volume. Thus each data point within a given sample volume shows the motion of that sample volume in the time interval between pulses.

After processing in accordance with this invention, the processed data would then be sent to color scan converter 108 for further processing as is well-known in the arts and described above.

The data shown in plot 200 includes clutter or undesirable signals resulting from reflection of the ultrasound pulses from stationary and slowly moving tissue in the patient superimposed on desired flow signals. For instance, sample volumes such as 210 and 220 are almost uniform horizontal lines, without any high frequency data and are almost entirely clutter. Other sample volumes such as 211 or 212 may be seen to have small signals which are barely discernable due to the large scale (30,000) displayed in FIG. 5. The signals shown in plot 200 may therefore be processed by subtracting a constant term representing such clutter from each sample volume. This is first step or the zeroth order subtraction used in this embodiment of the invention.

Figure 6:
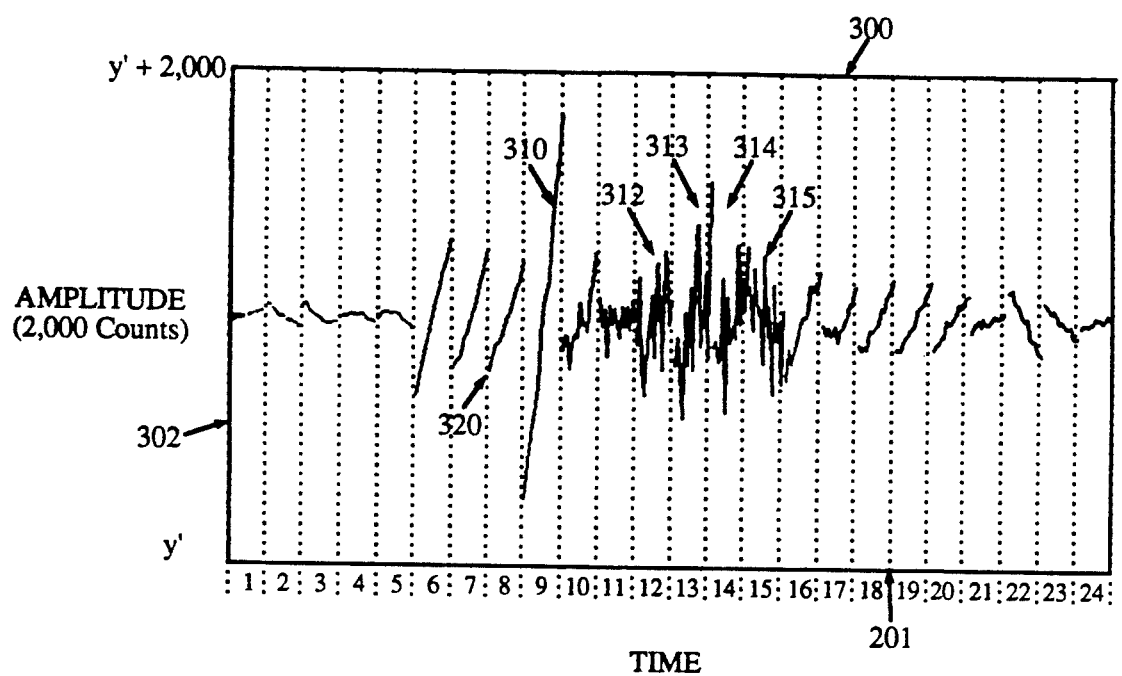
FIG. 6 shows the signals data from FIG. 5 after a constant term has been removed.
Figure 7:
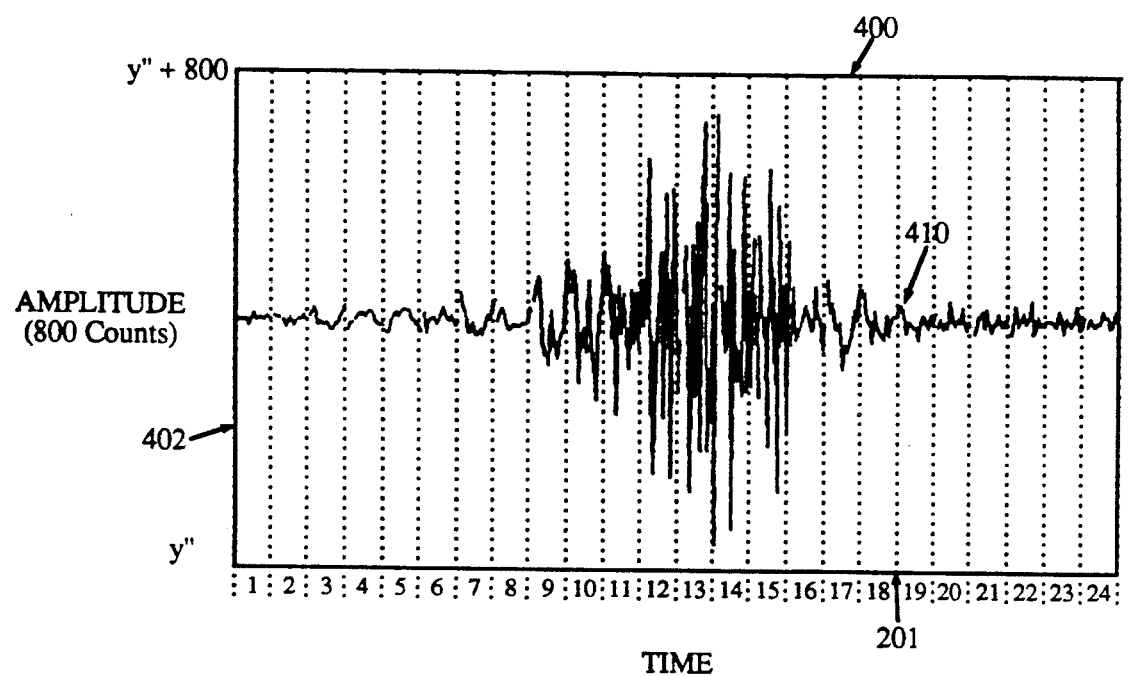
FIG. 7 shows the signal data from FIG. 6 after a linear term has been removed.

Plot 300 of FIG. 6 shows the results of subtracting constant terms from each of the 24-color sample volumes shown in FIG. 5. It should be noted that the dynamic range of the signals has been substantially reduced from 30,000 maximum range amplitude values to 2,000 maximum range amplitude values as shown on scale 302. With this first subtraction, desirable Doppler signals from blood flow start to appear in sample volumes 312 through 315, however, there is still clutter in the signal.

For instance, in regions 310 and 320, there are linear terms present in the ultrasonic data resulting from slowly moving targets in the patient. These terms may arise from venous or arterial wall motion due to the arterial pulse. Because of the very low velocity of these moving targets, what appears as line segments in sample volumes such as 310 and 320, are actually portions of low frequency sinusoidal motions which have been sampled by the time window of each sample volume (which is too short to resolve the full waveform). These line segments may thus also be recognized as clutter and subtracted from the signals shown in plot 300.

In one prior art method, low frequency portions of the Discrete Fourier Transform (DFT) of the signal were simply dropped out. This prior art and other conventional filtering approaches are equivalent to removing this type of clutter by fitting the linear drift of each waveform with sinusoids that have integer numbers of full cycles over the length of each sample volume. A large number of sinusoidal terms would be required to be removed from the Doppler signal in order to adequately remove this type of clutter signal from signal portions such as 310 and 320. The signal data thus becomes very heavily filtered. This heavy filtering will affect the useful Doppler signals by reducing the signal-to-noise ratio and biasing the frequency estimate.

The preferred embodiment of this invention includes means for subtracting such linear terms from the portions of the low frequency sinusoids such as sample volumes 310 and 320. The results of such subtraction is shown on plot 400 of FIG. 7. Again note the y-axis scale change and the improved definition of the desirable flow signals. Also note that this has been accomplished without the use of a high pass filter.

The preferred embodiment provides a means for subtracting additional orders of basis functions from the signal, for example, a quadratic term may also be subtracted from each color sample volume as shown in FIG. 8 as plot 500. Plot 500 has the same y-axis range as plot 400. Plot 500 is now virtually undistorted by clutter.

In certain embodiments relating to specific anatomical regions of the patient, even higher order basis functions may be subtracted from the signal data in order to obtain the cleanest signal possible however, it has been found that three or four orders of basis function removal usually provides satisfactory results. The preferred embodiment, however, provides a means for selecting these higher orders of basis functions for clutter removal in order to obtain the best frequency estimation for the user's requirements.

In one embodiment, the highest order of basis function subtracted from the frequency data is selectable via computer keyboard 125 or other similar selector dial.

The basis functions in the preferred embodiment are based upon the Legendre series of polynomials. The first four Legendre polynomials are:

$P_0(x) = 1$ $P_1(x) = x$ $P_2(x) = \frac{1}{2}(3x^2 - 1)$ $P_3(x) = \frac{1}{2}(5x^3 - 3x)$ wherein the subscript represents the order of Legendre polynomial. In the preferred embodiment, these polynomials are normalized to have unit power over the sample volume.

By parameterizing the clutter as a low order polynomial based upon the Legendre series, clutter is efficiently removed while minimizing adverse effects to the desirable signals. This also has the important benefit of requiring less computation time than a power series, thus improving overall performance and reducing the execution time to determine the frequency estimate for a particular sample volume. Significantly fewer pulses are required per sample volume for a given level of performance, thus reducing again the number of calculations required, which allows higher frame rates of the ultrasonic imaging apparatus without a loss in quality. Finally, sensitivity to lower velocity flows is also greatly enhanced.

It can be appreciated by one skilled in the art that this technique has may have important applications in other fields wherein low frequency data is sought to be eliminated through signal processing.

METHOD OF THE PREFERRED EMBODIMENT

The method of the preferred embodiment provides for the simultaneous determination of clutter and frequency estimate of the Doppler signal data in real time. We assume that a Doppler signal may satisfy a first order difference equation as follows:

$$signal_{i+1} \approx \alpha \times signal_i.$$

Also assume that the data sampled is a signal plus a low order polynomial:

$$data_i = a + bi + ci^2 + \ldots signal_i$$

wherein the polynomial may represent clutter. Solving for signal i in the second equation and substituting into the first order difference equation yields the following:

$$data_{i+1} - (a + b(i+1) + c(i+1)^2 + \ldots) \approx \alpha \times (data_i - (a + bi + ci^2 + \ldots))$$

and rearranging gives:

$$data_{i+1} = a(1-\alpha) + b + c + \ldots + (b(1-\alpha) + 2c + \ldots)i + (c(1-\alpha) + \ldots)i^2 + \alpha \times data_i.$$

Since $\alpha$ is a constant this can be rewritten as:

$$data_{i+1} = a' + b'i + c'i^2 + \alpha \times data_i$$

where the primed coefficients are simply related to the unprimed ones. The power series is convenient not only because it fits the clutter well, but also because a translated power term can be represented as a linear combination of terms of lower or equal powers. This allows the same form of the equation that holds for the "signal" to also hold true for the "data".

The theoretical basis of the preferred embodiment is to simultaneously solve for the polynomial coefficients and the prediction error coefficient by the method of least-squares. The least-squares problem using a single basis function can be expressed as follows:

$$y_{i+1} \approx \alpha f_i + \alpha y_i$$

where $f_i$ is the basis function. The mean squared error is:

$$error^2 = \{(y_{i+1} - a f_i - \alpha y_i)(y_{i+1}^* - a^* f_i^* - \alpha^* y_i^*)\}$$

wherein $y^*$, $a^*$, $f^*$, etc. denote complex conjugate, and items within $\{\ \}$ signify an average over the data samples. If there are n samples, 1 through n, in the function y then the average is from 1 through $n-1$. The function f is defined only over the shorter interval. Setting the partial derivatives to zero gives:

$$\{y_{i+1} f_i^*\} = a\{f_i f_i^*\} + \alpha\{y_i f_i^*\}$$

$$\{y_{i+1} y_i^*\} = a\{y_i^* f_i\} + \alpha\{y_i y_i^*\}.$$

Then, the following simplifying substitutions may be made:

$$a_{lo} = \{y_i f_i^*\}$$

$$a_{hi} = \{y_{i+1} f_i^*\}$$

$$R_l = \{y_{i+1} y_i^*\}$$

$$R_{0lo} = \{y_i y_i^*\}$$

$a_{lo}$ and $a_{hi}$ represent the least-squares coefficients for fitting only the function f to the low or high $n-1$ points of the data. $R_1$ is the first lag of the auto-correlation and $R_{0lo}$ is the zero lag auto-correlation of the low $n-1$ points. If it is assumed that f is normalized ($\{f_i f_i^*\} = 1$), then the least-squares equations become:

$$a_{hi} = a + \alpha a_{lo}$$

$$R_l = a a_{lo}^* + \alpha R_{0lo}.$$

Solving for $\alpha$ gives:

$$\alpha = \frac{R_1 - a_{hi} a_{lo}^*}{R_{0lo} - a_{lo} a_{lo}^*}.$$

A power series of m functions are used in the preferred embodiment to fit clutter. A set of orthonormal basis functions based on the Legendre polynomials are used in the preferred embodiment. The equation for the data thus becomes:

$$y_{i+1} \approx \sum_{j=0}^{m-1} a_j P_j(i) + \alpha y_i$$

where $P_j$ is the jth order modified Legendre polynomial. The least squares solution for $\alpha$ is given by:

$$\alpha = \frac{R_1 - \sum_{j=0}^{m-1} a_{jhi} a_{jlo}^*}{R_{0lo} - \sum_{j=0}^{m-1} a_{jlo} a_{jlo}^*}$$

wherein $a_{jhi}$ and $a_{jlo}$ are the jth coefficients for fitting the function to the low or high $n-1$ samples.

The preferred embodiment accumulates $R_{0lo}$ and $R_1$ from products of the data with itself, and the $a_{jlo}$ and $a_{jhi}$ coefficients from the product of the data and pre-computed Legendre values, all as the data is being sampled. After the last sample comes in the modifications to these $R_1$ and $R_{0lo}$ as indicated by the numerator and denominator of the above equation, respectively. Then the calculation of flow parameters such as frequency, amplitude, or turbulence are performed as in prior art.

Figure 9A:
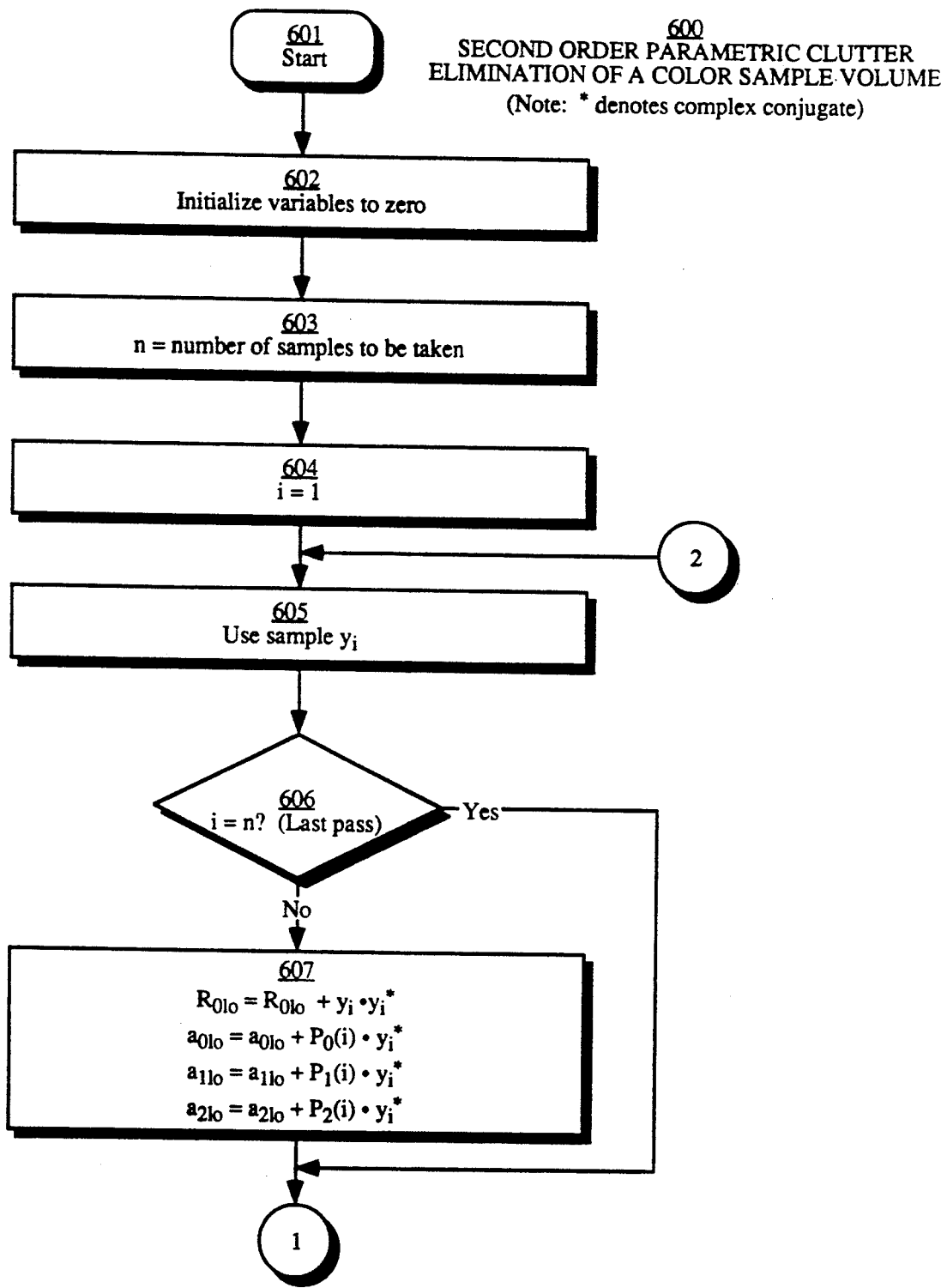
FIGS 9a and 9b shows the process of parametric clutter elimination (such as that performed on the data of FIG. 5 in FIGS. 6 through 8) for a series of second order Legendre polynomials which may be performed upon n samples of signal data.
Figure 9B:
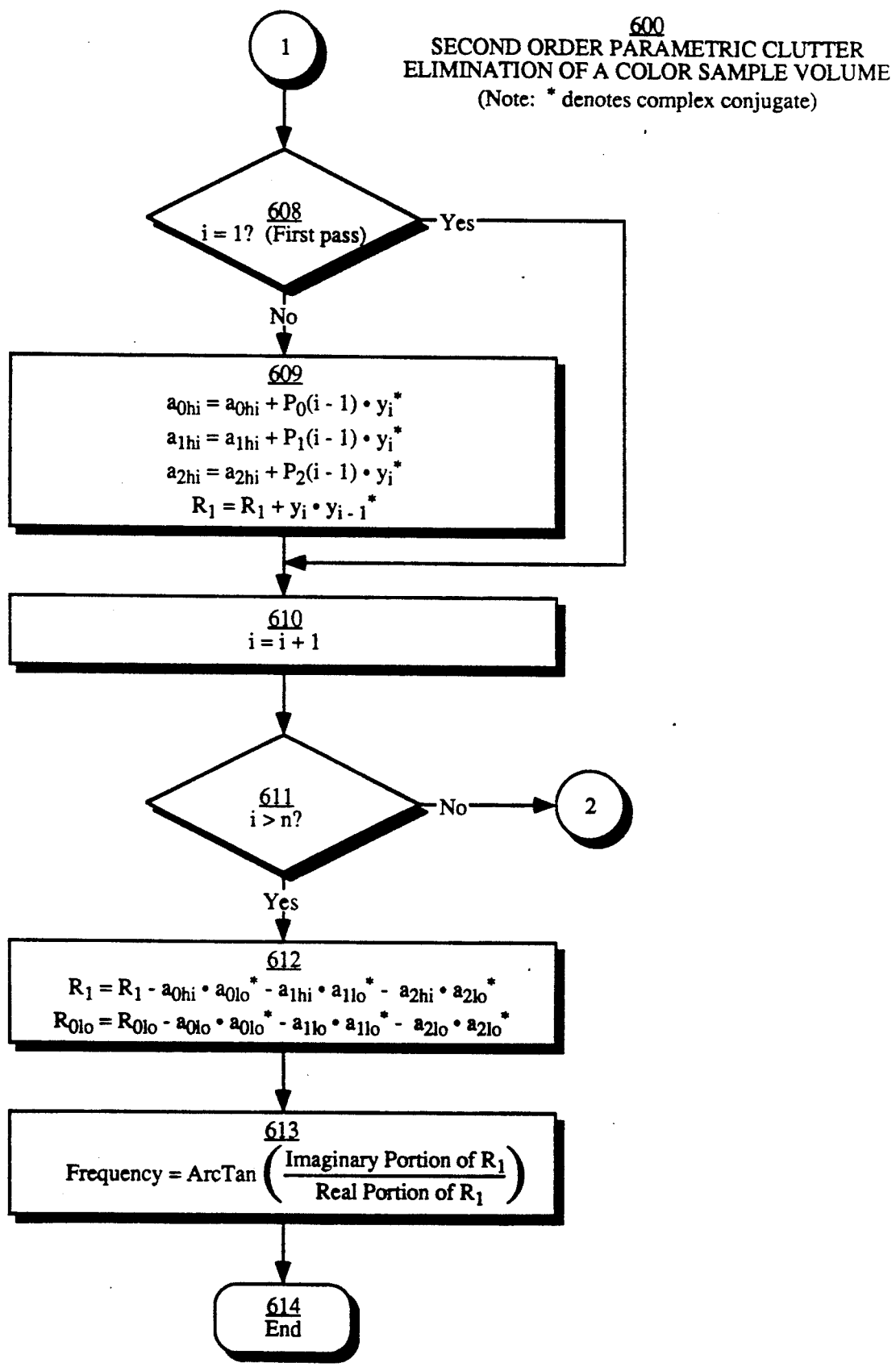

The method of one embodiment of the present invention, as generally described above, can be summarized most clearly by the flowcharts in FIGS. 9a and 9b. Flowchart 600 in FIG. 9b describes a method used for parametric clutter elimination for a single sample volume using three orders (from zero to second order) of Legendre polynomials. Note that the variables are complex and thus have in-phase (I) and quadrature (Q) components (sometimes called the real and imaginary components). The method performed according to that disclosed in FIGS. 9a and 9b effects both components of the data.

Process 600 starts at 601 and initializes all variables such as $R_{0lo}$, $R_1$, $a_{0lo}$, $a_{1lo}$, $a_{2lo}$, etc. to zero at step 602. This is so that the respective lag values and the least squares coefficients may be accumulated on successive passes through the process. At 603, n denotes the number of samples to be taken. In certain prior art systems, the number of samples was fairly large (such as 16, 32, etc.), however, in this method, fewer samples are required in order to obtain a useful frequency estimate of the Doppler data. By using the same number of samples as in the prior art, however, even lower velocity flows may be detected from the clutter. In either case, a vast improvement is achieved over prior art methods and apparatus.

At step 604, the index i is initialized to 1, and, at step 605, the appropriate sample $y_i$ is retrieved. Note that samples such as $y_i$ for each of the samples n can be sampled at subsequent passes of 605 while process 600 is underway. This generally results in less time being required to complete the calculations for a single sample volume, since it is not necessary to wait for all the data to be acquired before beginning the process.

Alternatively, samples may be taken and digitized at a first discrete time interval, and processed iteratively by 600 at a second discrete interval. It can be appreciated by one skilled in the art that the various timing requirements may be a factor determining whether the data will be sampled in real time, or sampled all at once in a first time interval, and processed at a second time interval.

Process 600 proceeds to step 606 which determines whether the index i is equal to n indicating that this is the last pass of clutter elimination process 600. If so, then step 607 is skipped, and process 600 proceeds to step 608 in FIG. 9b. If index i is not equal to n, step 607 is performed on subsequent data samples.

Step 607 accumulates the $R_{0lo}$, $a_{0lo}$, $a_{1lo}$, and $a_{2lo}$ values on successive iterations of steps 605 through 611 in FIGS. 9a and 9b. On the first pass, step 602 initializes $R_{0lo}$, $a_{0lo}$, $a_{1lo}$, and $a_{2lo}$ to zero. $R_{0lo}$ is the zero lag auto correlation of the low n−1 points, and $a_{0lo}$, $a_{1lo}$, and $a_{2lo}$ are the least square's coefficient for fitting the low n−1 points of the data.

The $R_{0lo}$ value is accumulated by adding the previous $R_{0lo}$ value and the product of the function $y_i$, and its complex conjugate $y_i^*$. The values are accumulated by adding each current value and the product of the Legendre function $P_j(i)$ multiplied by the complex conjugate $y_i^*$. For example, $a_{0lo}$ is equal to $a_{0lo} + P_0(i) \cdot y_i^*$.

In process 600 of FIGS. 9a and 9b, the second order $P_2$ of the Legendre polynomials is used, however, it can be appreciated by one skilled in the art that step 607 could comprise additional least squares coefficients and/or Legendre polynomials for higher orders of parametric clutter removal.

For the last loop through process 600, step 607 is skipped, and thus the $R_{0lo}$, $a_{jlo}$ values are not accumulated because these are only calculated for the first n−1 passes of the loop. Upon the completion of step 606 on the last pass through the loop, or the completion of step 607 for all other passes through the loop, process 600 proceeds to step 608 as shown in FIG. 9b.

Step 608 determines whether process 600 is on the first pass through the loop, wherein i is equal to 1. In that case, step 609 is skipped, and process 600 proceeds to step 610. If it is not the first pass through the loop, then process 600 proceeds to step 609.

Step 609 accumulates the $a_{jhi}$ least squares coefficients for fitting the function to the high n−1 points of the data. Step 609 on each pass also accumulates the $R_1$ value which is the first lag of the auto correlation and is not accumulated on the first loop through the process. The least squares coefficients $a_{jhi}$ are accumulated using the previous value of each of the least squares coefficients, and the $P_j$ Legendre function for i−1, multiplied by $y_i^*$. Further the $R_1$ first lag auto correlation value is accumulated by adding the current value of the first lag auto correlation $R_1$, and the product of the current sample $y_i$ and the complex conjugate of the previous sample, $y_{i-1}^*$.

After the completion of step 608 on the first pass through the loop, or step 609 on all other passes through the loop, then process 600 proceeds to step 610 which increments the index i, and determines whether i is greater than n at step 611. This is to determine whether n samples have been processed. If n samples have not been processed, then process 600 returns to step 605 in FIG. 9a. Steps 605 through 611 are performed until i is greater than n, or the total number of samples has been processed and the lag and coefficient values have been fully accumulated. Once step 611 determines that i has exceeded n, then process 600 proceeds to step 612 and calculates the final $R_1$ and $R_{0lo}$ auto correlation values.

The first lag of the auto correlation $R_1$ is computed by subtracting from the accumulated $R_1$ the sum of products of each of the least squares coefficients for the high n−1 points $a_{jhi}$ multiplied by the complex conjugate of the least squares coefficients for the low n−1 points $a_{jlo}^*$.

Similarly, the final value for the $R_{0lo}$ auto correlation value is computed by subtracting from the accumulated $R_{0lo}$ the sum of the products of the least squares coefficients for the low n−1 points $a_{jlo}$ of the data and each of their complex conjugates $a_{jlo}^*$. Then, after the $R_1$ and the $R_{0lo}$ auto correlation lags are computed, a frequency estimation is performed at step 613 wherein the arctangent of the ratio between the imaginary (or quadrature) portion of the first lag of the auto correlation $R_1$ and the real (or in-phase) portion of the first lag $R_1$ of the auto correlation is determined.

Note that $R_{0lo}$ is not used for the frequency estimate, but is instead used by another process in module 104 for thresholding the data. The result of this arctangent operation provides the frequency estimate which is then output to color scan converter for the particular color sample volume. Process 600 ends at step 614, and the method may be applied to another sample volume.

Although process 600 is only applied to one color sample volume in this example, it can be appreciated by one skilled in the art that the process may be repeated for as many sample volumes that are in the region of interest in the patient desired to be processed. It can also be appreciated by one skilled in the art that this process may be applied to any data which may be processed in such a manner using basis functions subtracted from a signal. It can also be appreciated by one skilled in the art that utilizing a method such as this, that the number of samples may be reduced because the signal-to-noise ratio has been preserved and the desirable Doppler signal has not been substantially effected.

Further, because the process of the preferred embodiment uses a sequence of higher order equations instead of trigonometric functions such as sinusoidal waveforms fit to existing data, computational performance can be substantially increased in the imaging system. It can be appreciated by one skilled in the art that the parametric clutter elimination process described by the preferred embodiment has substantial improvements over the prior art filtering discussed in the background section above.

Although the implemented embodiment of the present invention is performed in a computer programming language which is compiled and generated into object code, which is executed by color flow module 104 during run time, it can be appreciated by one skilled in the art that this invention may be implemented in discrete circuitry, firmware, or other types of devices commercially available such as digital signal processing integrated circuits. It can be appreciated by one skilled in the art that many departures and modifications may be made within the spirit and scope of the present invention.

Thus an invention for performing parametric clutter elimination on signal data has been described. Although the present invention has been described specifically with reference to FIGS. 1 through 9b, it can be appreciated by one skilled in the art that this invention has application far exceeding that disclosed in the figures. It should be obvious to one skilled in the art that many departures and modifications may be made from the embodiments as disclosed herein, without detracting from the present invention.

What is claimed is:

1. An apparatus for clutter elimination from signals comprising:
   a. a means for digitizing a signal to generate n samples;
   b. a means for fitting a first basis function to said n samples;
   c. a means for subtracting the first basis function from said n samples and storing the difference in a first difference signal; and
   d. a means for performing a frequency estimate from said first difference signal.

2. The apparatus of claim 1 further comprising:
   a. a means for fitting a second basis function to the first difference signal, said second basis function having a next higher order than said first basis function; and
   b. a means for subtracting the second basis function from said first difference signal and storing the difference in a second difference signal.

3. The apparatus of claim 1 further comprising:
   a. a means for fitting j basis functions to the first difference signal, each of said j basis functions having a next higher order than said previous basis function; and
   b. a means for subtracting each of said j basis functions from said j−1 difference signal and storing the difference in a first difference signal.

4. The apparatus of claim 3 wherein said j basis functions comprise Legendre polynomials.

5. The apparatus of claim 1 further comprising:
   a. signal transmission means for transmitting a reference pulse; and
   b. signal receiver means for receiving reflected pulses produced by reflecting said reference pulse.

6. The apparatus of claim 5 wherein said transmission means and said receiver means comprise acoustic signal transmission and reception means.

7. The apparatus of claim 1 wherein said means for determining the first basis function comprises a means for determining the mean of said signal.

8. The apparatus of claim 1 wherein said means for subtracting the first basis function comprises a means for accumulating a complex conjugate of n samples each multiplied by the first basis function.

9. The apparatus of claim 2 wherein said means for subtracting the second basis function comprises a means for accumulating a complex conjugate of n samples each multiplied by the second basis function.

10. The apparatus of claim 3 wherein said means for subtracting each of said j basis function comprises a means for accumulating a complex conjugate of n samples each multiplied by the jth basis function.

11. An apparatus for clutter elimination from signals comprising:
    a. signal reception means for receiving signals;
    b. means for digitizing said signals to generate n samples;
    c. means for accumulating the coefficient of a fit to a first basis function for the lowest of the first n−1 samples in a first accumulated value;
    d. means for accumulating the coefficient of a fit to a first basis function for the highest of the last n−1 samples in a second accumulated value;
    e. means for accumulating the first lag of the autocorrelation in a first autocorrelation value;
    f. means for accumulating the zero lag autocorrelation in a second autocorrelation value; and
    g. means for determining a frequency estimate from the first autocorrelation value and the first and second accumulated values.

12. The apparatus of claim 11 further comprising a means for determining a final zero lag autocorrelation value from the first accumulated value and the second autocorrelation value.

13. The apparatus of claim 11 further comprising a means for accumulating coefficients of fits for j basis functions for the lowest n−1 samples in the first accumulated value, and a means for accumulating coefficients of fits for j basis functions for the highest n−1 samples in the second accumulated value.

14. An apparatus for clutter elimination from signals comprising:
    a. a means for digitizing a signal to generate n samples;
    b. a means for fitting j basis functions to the n samples, each of said j basis functions having a next higher order than a previous j basis function;
    c. a means for subtracting each of said j basis functions from said signal and storing the difference as difference signals; and
    d. a means for performing a frequency estimate from said difference signals.

15. A method of clutter elimination from signals comprising the following steps:
    a. digitizing a signal to generate n samples;

b. fitting a first basis function to said n samples;

c. subtracting the first basis function from said n samples and storing the difference in a first difference signal; and d. performing a frequency estimate from said first difference signal.

16. A method of clutter elimination from signals comprising the following steps:

a. digitizing a signal to generate n samples;

b. fitting a first set of basis functions to said n samples;

c. subtracting each of said first basis functions from said n samples and storing the difference in a first difference signal; and d. performing a frequency estimate from said first difference signal.

17. The method of claim 16 further comprising the following steps:

a. fitting a second basis function to the first difference signal, said second basis function having a next higher order than said first basis function; and b. subtracting the second basis function from said first difference signal and storing the difference in a second difference signal.

18. The method of claim 16 further comprising the following steps:

a. fitting j basis functions to the first difference signal, each of said j basis functions having a next higher order than said previous basis function; and b. subtracting each of said j basis functions from said first difference signal and storing the difference as a second difference signal.

19. The method of claim 18 wherein said j basis functions comprise Legendre polynomials.

20. The method of claim 16 wherein the step of determining the first basis function comprises determining the mean of said signal.

21. The method of claim 16 wherein the step of subtracting the first basis function comprises accumulating a complex conjugate of n samples of said signal each multiplied by the first basis function.

22. The method of claim 17 wherein the step of subtracting the second basis function comprises accumulating a complex conjugate of said n samples of said signal each multiplied by the second basis function.

23. A method of clutter elimination from signals comprising the following steps:

a. digitizing signals to generate n samples;

b. initializing an index i and a first difference signal;

c. fitting j basis functions to the ith sample, each jth basis function having a next higher order than said previous basis function;

d. subtracting each jth basis function from said ith sample and accumulating the difference in a first difference signal;

e. incrementing said index i;

f. repeating steps a through e until said index i equals n; and g. performing a frequency estimate from said first difference signal.

24. The method of claim 23 wherein the signals represents Doppler shift information from a reference pulse.

25. The method of claim 23 wherein the frequency information is generated in an ultrasonic imaging system.

26. A method of clutter elimination from signals comprising:

a. digitizing a signal to generate n samples;

b. fitting j basis functions to the n samples, each of said j basis functions having a next higher order than said previous basis function;

c. subtracting each of said j basis functions from said n samples and storing the difference in a first difference signal; and d. performing a frequency estimate from said first difference signal.

27. A method of clutter elimination from signals comprising:

a. digitizing signals to generate n samples;

b. fitting j basis functions to said n samples, each of said j basis functions having a next higher order than said previous basis function;

c. subtracting each of said j basis function from said n samples and storing the difference in a first difference signal; and d. performing a frequency estimate from said first difference signal.

28. A method of clutter elimination from signals comprising the following steps:

a. receiving signals;

b. digitizing said signals to generate n samples;

c. accumulating the coefficients of a fit to j basis functions for the lowest of the first n−1 samples in a first accumulated value;

d. accumulating the coefficients of a fit to j basis functions for the highest of the last n−1 samples in a second accumulated value;

e. accumulating the first lag of the autocorrelation in a first autocorrelation value;

f. accumulating the zero lag autocorrelation in a second autocorrelation value; and g. determining a frequency estimate from the first autocorrelation value and the first and second accumulated values.

29. The method of claim 28 further comprising determining a final zero lag autocorrelation value from the first accumulated value and the second autocorrelation value.

* * * * *